July 22, 1958  H. SCHWARZ ET AL  2,844,566
PRODUCTION OF POLYTHIOETHERS
Filed Dec. 5, 1955
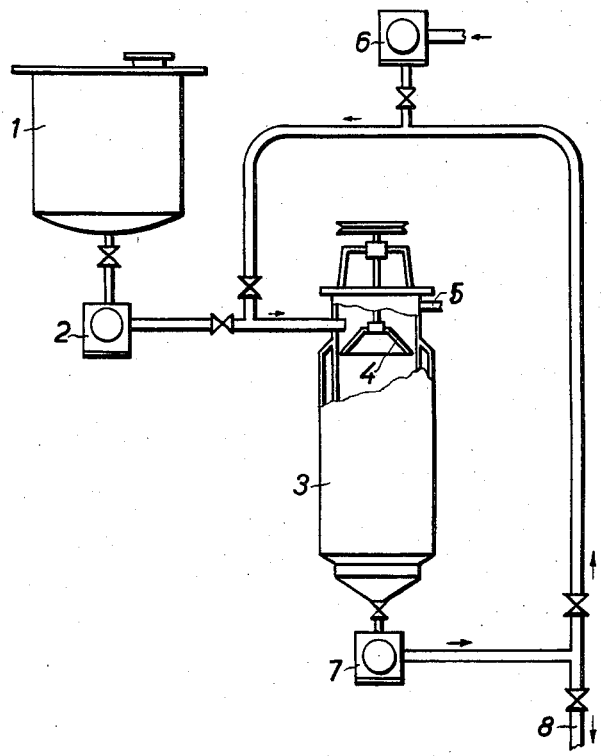
HERBERT                                                                 INVENTORS:
SCHWARZ, WILHELM KALLERT, CORNELIUS MÜHLHAUSEN, HANS HOLTSCHMIDT,
                                          BY
                                                                ATTORNEY

United States Patent Office 2,844,566
Patented July 22, 1958

2,844,566
PRODUCTION OF POLYTHIOETHERS

Herbert Schwarz, Leverkusen-Bayerwerk, Wilhelm Kallert, Koln-Stammheim, Cornelius Mühlhausen, Leverkusen-Bayerwerk, and Hans Holtschmidt, Koln-Stammheim, Germany, assignors to Farbenfabriken Bayer Aktiengesellschaft, Leverkusen, Germany, a corporation of Germany Application December 5, 1955, Serial No. 551,165

Claims priority, application Germany December 4, 1954

7 Claims. (Cl. 260—79)

This invention relates to a process for making odorless polythioethers. More particularly, the invention is concerned with a process for the production of odorless polythioethers containing terminal hydroxyl groups and having a molecular weight within the range of 800 to 10,000.

In copending application Serial No. 547,304, filed November 16, 1955, by one of us and assigned to the same asignee as the present case, there is disclosed a new class of hydroxyl polythioethers having a molecular weight within the range of 800 to 10,000. These polythioethers are prepared by reacting in the presence of a dehydration catalyst, while distilling off the water formed in the reaction, a polyhydric alcohol with a thioether glycol in a molar ratio within the range of about 1:1 to about 1:1.5 at a temperature of between 100° and 300° C. In this reaction there are formed small amounts of cyclic thioethers as by-products which impart an unpleasant odor to the polythioethers produced, representative examples of such cyclic thioethers being 4,4-thioxane and 1,4-dithiane of the following formulae:

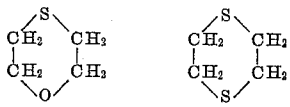

The presence of these odor-causing cyclic thioethers impairs the suitability of the polythioethers for use as starting material in the plastics industry.

Although the undesirable cyclic thioethers are readily volatile with steam, a mere blowing of the polythioethers with ordinary or superheated steam is not sufficient to remove the last traces of the cyclic thioethers from the viscous polythioether phase since the ratio of surface area to the amount of substance is unfavorable, particularly with relatively large batches, so that an exchange with the gaseous phase is possible only to a very limited degree. But even if a falling film evaporator is used in the blowing with steam to create a larger surface of the material, the odor-causing cyclic thioethers contained in the polythioethers cannot be removed completely because of the high viscosity of the latter.

It is an object of the present invention to provide hydroxyl polythioethers having a molecular weight within the range of 800 to 10,000 which are free of odor-causing by-products. Another object is to provide a process for preparing these odorless polythioethers. Further objects will appear hereinafter.

It has now been found that odorless hydroxyl polythioethers having a molecular weight within the range of 800 to 10,000 can be produced if the final stage of the reaction between the polyhydric alcohols and the thioether glycols in accordance with the above-mentioned copending application is carried out under such conditions that the reaction mixture has a large surface which is being constantly renewed. This can be achieved, for example, by causing the reaction mixture to run at elevated temperature in a thin layer over a stationary or moving surface.

In the production of polythioethers according to the above-identified copending application, the hydroxyl number of the reaction mixture gradually decreases in proportion to the increase in the molecular weight of the polythioether being formed. The final stage of the reaction as referred to herein starts when the hydroxyl number of the reaction mixture is 10 to 100 units higher than the hydroxyl number of the desired polythioether.

Thus, according to the present invention there is provided a process for the manufacture of odorless hydroxyl polythioethers having a molecular weight of between 800 and 10,000 which comprises heating in the presence of a dehydration catalyst, while distilling off the water formed in the reaction, a polyhydric alcohol with a thioether glycol in a molar ratio within the range of about 1:1 to about 1:1.5 and at a temperature ranging from about 100° to about 300° C., said heating being carried out in any suitable reaction vessel until the hydroxyl number of the reaction mixture has reached a value about 10 to 100 units higher than the hydroxyl number of the desired polythioether, and then effecting the final stage of the reaction by causing the reaction mixture to run in a thin layer over a stationary or moving surface at a temperature ranging from about 100° to 300° C., while distilling off reaction water and the odor-causing compounds formed as by-products, until the product of the reaction has reached the hydroxyl number of the desired polythioether and is free of odor-causing by-products.

In accordance with a preferred embodiment of the present invention, water and/or an inert organic solvent is introduced into the reaction mixture while the latter is caused to run in a thin layer over a stationary or moving surface at elevated temperature. As a result, steam and/or solvent vapor is formed which entrains the odor-causing cyclic thioethers contained in the reaction mixture and, thus, facilitates their removal. From an optimum viewpoint, it is preferred to use reduced pressure during the final stage of the reaction in order to speed up the removal of the water formed in the etherification and of the auxiliary substance (water and/or inert organic solvent) added as an entrainer.

An apparatus suitable for carrying out the process of the invention is a falling film evaporator as shown diagrammatically in the accompanying drawing.

Referring to the drawing, numeral 1 designates a condensation vessel in which the reaction is effected to such a degree that the hydroxyl number of the product is about 10 to 100, and preferably 20 to 50, units higher than the hydroxyl number of the desired polythioether. The reaction mixture passes by way of pump 2 into the falling film evaporator 3. The latter is equipped with the rotor 4 which provides for a good distribution of the reaction mixture over the walls of the evaporator. By using temperatures between 100° and 250° C. and applying a vacuum to the pipe union 5, the reaction is continued and at the same time the removal of the odor-causing cyclic thioethers is effected. Water and/or an inert organic solvent may be added by way of the pump 6 to the reaction mixture prior to its entry into the apparatus in order to facilitate the removal of the odor-causing substances by entrainment. If the sojourn time of the reaction mixture during a single passage through the apparatus is insufficient for terminating the reaction and removing the odor-causing cyclic thioethers and the water and/or inert solvent used as an entrainer, the operation can be repeated as often as necessary by recycling the material with the aid of pump 7. After the reaction mixture has reached the required hydroxyl number and the odor-causing cyclic thioethers and the entrainer have been removed completely, the reaction mixture is discharged through pipe 8.

It is, of course, possible to control the degree of etherification during the process of the invention by periodically measuring the viscosity of the reaction mixture by means of a throughflow viscometer since the viscosity of the product rises as the reaction proceeds and the hydroxyl number decreases.

The odorless hydroxyl polythioethers obtainable by the process of the instant invention are useful as starting materials for the production of polyurethane plastics as disclosed and claimed in the above-mentioned copending application.

In order that the present invention may be more completely understood, the following examples are set forth in which all parts are parts by weight. These examples are given primarily for the purpose of illustration and any specific enumeration of detail contained therein should not be interpreted as a limitation on the case except as indicated in the appended claims.

Example 1

122 parts of thiodiglycol are initially stirred for four hours at 100° C. with 90 parts of 1,4-butylene glycol and 0.5% of p-toluene-sulfonic acid methyl ester. The mixture is then heated at 160° C. and a water jet vacuum is applied after five hours. When the OH value has reached 120, this being determined by taking a sample, the further condensation is carried out at 160° to 180° C. in the falling film evaporator previously referred to. After the polyether has been circulated for about four hours, during which time about 30 parts of water have been added, the odor has completely disappeared. The last traces of water are removed with a vacuum of 15 mm. The further condensation is carried out in vacuo until an OH value of 60 is reached.

Example 2

122 parts thiodiglycol and 62 parts of ethylene glycol are condensed according to Example 1 with addition of 0.25% of p-toluene-sulfonic acid methyl ester until an OH value of 80 is reached. After the condensation has been continued for three hours at 170° C. in the falling film evaporator hereinbefore described and illustrated in the drawing, with addition of 20 parts of water, the odor has disappeared and an OH value of 52 has been reached.

Example 3

366 parts of thiodiglycol are condensed in accordance with Example 1 with 177 parts of hexanediol and 134 parts of trimethylol propane, with addition of 0.5% of p-toluene-sulfonic acid methyl ester, until an OH value of 350 is reached. The final condensation is carried out in the falling film evaporator described above until the OH value is 280. The odor of the polyether has completely disappeared.

Example 4

244 parts of thiodiglycol are initially condensed according to Example 1 with 90 parts of 1,4-butylene glycol, 118 parts of 1,6-hexanediol and 2.3 parts of p-toluene-sulfonic acid methyl ester until the OH value is 60. After admixing 70 parts of diethyl benzene, the mixture is passed through the falling film evaporator described above at a temperature of 120° C. and a vacuum of 40–50 mm. The mixture is circulated at a rate of 300 g./min. with supplementary admixture of 16 cc. of water per minute, a ternary mixture of diethyl benzene, water and odorous substance being distilled off. The addition of water is continued until a clear distillate free from diethyl benzene comes over. The circulation of the mixture is then continued at an evaporator temperature of 150° C. and under a vacuum of 12–15 mm. until the OH value is 50. The final product is completely odorless.

What is claimed is:

1. In a process for the production of hydroxyl polythioethers having a molecular weight of between 800 and 10,000 wherein a polyhydric alcohol is heated with a thioether glycol in the presence of a dehydration catalyst and at a temperature ranging from about 100° to about 300° C., the molar ratio of the polyhydric alcohol to the thioether glycol being within the range of about 1:1 to about 1:1.5, the improvement which comprises causing the reaction mixture to run during the final stage of the reaction in a thin layer over a surface at a temperature ranging from about 100° to about 300° C. to thereby free the reaction mixture from odor-causing by-products and at the same time complete reaction.

2. The process of claim 1 in which said surface is kept under reduced pressure.

3. In a process for the production of hydroxyl polythioethers having a molecular weight of between 800 and 10,000 wherein a polyhydric alcohol is heated with a thioether glycol in the presence of a dehydration catalyst and at a temperature ranging from about 100° to about 300° C., the molar ratio of the polyhydric alcohol to the thioether glycol being within the range of about 1:1 to about 1:1.5, the improvement which comprises causing the reaction mixture to run during the final stage of the reaction in a thin layer over a surface at a temperature ranging from about 100° to about 300° C. while adding to said reaction mixture an entrainer selected from the group consisting of water and inert solvents to thereby free said reaction mixture from odor-causing by-products and at the same time complete the reaction.

4. The process of claim 3 in which said surface is kept under reduced pressure.

5. In a process for the production of hydroxyl polythioethers having a molecular weight of between 800 and 10,000 wherein a polyhydric alcohol is heated with a thioether glycol in the presence of a dehydration catalyst and at a temperature ranging from about 100° to about 300° C., the molar ratio of the polyhydric alcohol to the thioether glycol being within the range of about 1:1 to about 1:1.5, the improvement which comprises causing the reaction mixture to run during the final stage of the reaction in a thin layer over a surface at a temperature ranging from about 100° to about 300° C. while adding to said reaction mixture water to thereby free said reaction mixture from odor-causing by-products and at the same time complete the reaction.

6. The process of claim 5 in which said surface is kept under reduced pressure.

7. In the manufacture of a polythioether having terminal hydroxyl groups and a molecular weight of at least about 800 by a process comprising condensing a thioether glycol and a polyhydric alcohol, the method of separating volatile cyclic by-products formed during the condensation from the polythioether which comprises flowing a stream of the mixture during the final stages of the condensation over a heated surface whereby said volatile cyclic by-products are distilled and distillation of the polythioether is avoided.

References Cited in the file of this patent

UNITED STATES PATENTS

| | | |
|---|---|---|
| 2,311,567 | Otto et al. | Feb. 16, 1943 |
| 2,392,402 | Patrick | Jan. 8, 1946 |
| 2,518,245 | Morris et al. | Aug. 8, 1950 |